(12) United States Patent
Kolton et al.

(10) Patent No.: US 8,595,835 B2
(45) Date of Patent: Nov. 26, 2013

(54) SYSTEM TO ENABLE DETECTING ATTACKS WITHIN ENCRYPTED TRAFFIC

(75) Inventors: Doron Kolton, Pardesiya (IL); Adi Stav, Tel Aviv (IL); Asaf Wexler, Ra'anana (IL); Ariel Ernesto Frydman, PetachTikva (IL); Yoram Zahavi, Zichron Ya'akov (IL)

(73) Assignee: Trustwave Holdings, Inc., Chicago, IL (US)

( * ) Notice: Subject to any disclaimer, the term of this patent is extended or adjusted under 35 U.S.C. 154(b) by 0 days.

(21) Appl. No.: 13/006,230

(22) Filed: Jan. 13, 2011

(65) Prior Publication Data

US 2011/0283101 A1 Nov. 17, 2011

Related U.S. Application Data

(63) Continuation of application No. 11/325,234, filed on Jan. 4, 2006, now Pat. No. 7,895,652.

(60) Provisional application No. 60/641,587, filed on Jan. 4, 2005.

(51) Int. Cl.
*G06F 21/00* (2013.01)

(52) U.S. Cl.
USPC .......................................... 726/23; 713/151

(58) Field of Classification Search
USPC ............... 726/22, 23; 709/224; 713/151, 193; 380/277
See application file for complete search history.

(56) References Cited

U.S. PATENT DOCUMENTS

| | | | |
|---|---|---|---|
| 6,363,477 B1 * | 3/2002 | Fletcher et al. | 713/151 |
| 7,082,530 B1 * | 7/2006 | Diamant | 713/153 |
| 7,359,962 B2 | 4/2008 | Willebeek-LeMair et al. | |
| 7,447,909 B2 * | 11/2008 | Reith | 713/183 |
| 7,895,652 B2 | 2/2011 | Kolton | |
| 2003/0018891 A1 * | 1/2003 | Hall et al. | 713/160 |
| 2003/0229809 A1 * | 12/2003 | Wexler et al. | 713/201 |
| 2004/0091113 A1 * | 5/2004 | Sanai | 380/255 |
| 2004/0243349 A1 | 12/2004 | Greifeneder et al. | |
| 2005/0094809 A1 * | 5/2005 | Pedlow et al. | 380/200 |
| 2005/0114663 A1 * | 5/2005 | Cornell et al. | 713/168 |
| 2006/0070066 A1 * | 3/2006 | Grobman | 718/1 |

OTHER PUBLICATIONS

USPTO, "Notice of Allowance" U.S. Appl. No. 11/325,234, dated Oct. 18, 2010 (9 pages).
International Search Report and Written Opinion from PCT/US06/00143, mailed Jul. 8, 2008 (7 pages).
USPTO, "Non-Final Office Action", U.S. Appl. No. 11/325,234, dated Jan. 29, 2010 (9 pages).
USPTO, "Restriction Requirement", U.S. Appl. No. 11/325,234, dated Nov. 13, 2009 (7 pages).

(Continued)

*Primary Examiner* — Hadi Armouche
(74) *Attorney, Agent, or Firm* — Hanley, Flight & Zimmerman, LLC

(57) ABSTRACT

Systems and methods for identification of network attacks are disclosed. An example system includes an adaptor module to route a received encrypted packet to a decryption module, receive a decrypted packet corresponding to the encrypted packet from the decryption module, and transmit the decrypted packet and the encrypted packet to a sensor module. The decryption module is to receive an encrypted packet, decrypt the encrypted packet to form the decrypted packet, and transmit the decrypted packet to the adaptor module. The sensor module is to inspect the decrypted packet and the encrypted packet received from the adaptor module to determine when an attack is detected.

16 Claims, 4 Drawing Sheets

(56) References Cited

OTHER PUBLICATIONS

USPTO, "Final Office Action", U.S. Appl. No. 11/325,234, dated May 20, 2009 (12 pages).

USPTO, "Non-Final Office Action", U.S. Appl. No. 11/325,234, dated Dec. 18, 2008 (12 pages).

USPTO, "Non-Final Office Action", U.S. Appl. No. 11/325,234, dated Jul. 1, 2008 (8 pages).

* cited by examiner

SYSTEM TO ENABLE DETECTING ATTACKS WITHIN ENCRYPTED TRAFFIC

RELATED APPLICATION

This application is a continuation of U.S. patent application Ser. No. 11/325,234, entitled SYSTEM TO ENABLE DETECTING ATTACKS WITHIN ENCRYPTED TRAFFIC, filed on Jan. 4, 2006, which claims the benefit of U.S. provisional patent application Ser. No. 60/641,587 entitled SYSTEM AND METHOD ENCOURAGING DETECTIONS OF ENCRYPTED TRAFFIC, filed on Jan. 4, 2005, which are incorporated herein by reference in their entirety.

FIELD OF THE INVENTION

The present invention generally relates to the field of network security and relates to a layered defense approach which is able to decrypt encrypted network traffic so that it can be analyzed.

BACKGROUND

As use of the internet for business-critical applications increases and new e-commerce and extranets proliferate, network security continues to increase in importance. Thanks to the openness and accessibility of the internet, which is the reason organizations embrace it in the first place, these new capabilities put sensitive information at risk.

While firewalls provide a first line of defense against unauthorized users, no single technology has been developed which solves all security problems. Attackers are increasingly experiencing vulnerabilities via the HTTP protocol, which is almost always allowed past the firewall. This allows attackers to gain access to corporate web-based services.

Intrusion detection systems (IDS) have become standard components in most network architectures as part of this layered approach. An IDS is the network equivalent of a burglar alarm. Its main purpose is to generate an alert when an attacker tries to hack into a network. To accomplish this, an IDS is equipped with both standard and customized attack signature detection engines. These engines are used to monitor and analyze network events for any signs of an attack or malicious activity.

However, sensitive web transactions are typically encrypted, for example, using Secure Sockets Layer (SSL). While encryption, such as SSL, is a critical component of many secure intranet transaction systems, IDS sensors cannot decrypt such traffic. This makes such sensors blind to the content of the encrypted traffic. Most attacks on network systems that can be done over unencrypted web traffic can also be done over the encrypted (SSL) link.

In the course of ordinary unencrypted web traffic, hacker activity or other net works attacks are usually detected by the IDS. The wide-spread usage of SSL presents a major dilemma, as IDS sensors cannot detect SSL traffic. As a result, encrypted SSL traffic passes through the IDS without examination. This renders the typical IDS ineffective because they cannot search incoming encrypted traffic for signatures indicative of an attack. To be effective, a network IDS needs to be able to examine all packets on the network segment. Without this capability, attackers can easily conceal their probes and attacks, such as a Unicode hack, SQL Injection, and buffer overflow, in the unexamined encrypted packets.

SUMMARY

A decryption system and method is provided that enhances the attack detection capabilities of a protected network. This system and method creates an enhanced intrusion detection system (EIDS) which can decrypt SSL encrypted or otherwise encrypted network traffic. The sensor module of the protected network detects attacks that were previously invisible to the network without terminating or otherwise interfering with the SSL session. A security software module of the EIDS receives the SSL traffic, decrypts it and provides it to the sensor module as if it were normal, unencrypted traffic. Any detected attack events are displayed and managed in the same way as the other events using the protected network's existing intrusion detection system. In this embodiment the decrypting capability is added to an existing IDS as an additional security software module.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for a an enhanced intrusion detection system ("EIDS"). The system is able to decrypt encrypted network traffic so that it can be read and analyzed to detect attacks. An attack is an unauthorized assault on a computer system which may include: (a) viruses, in which a specified program is caused to run on the computer, which then attempts to spread itself to other computers known to the host computer (e.g., those listed in the address book); and (b) denial of service attacks (DoS), in which a group of computers is exposed to so many requests that it effectively loses the ability to respond to legitimate requests. This description will be made primarily with reference to SSL encryption, however various embodiments of the system and methods can also be used with other encryption systems and with multiple encryption systems. For example, IPSEC and TLS protocols the multitude of encryption algorithms that they support, for example RSA, DES/3DES, Blowfish, IDEA, SEAL, and RC4, can also be used. These protocols are used to encrypt web communication, emails, vpn connection, database connections, as well as applications implementing client/server architectures.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
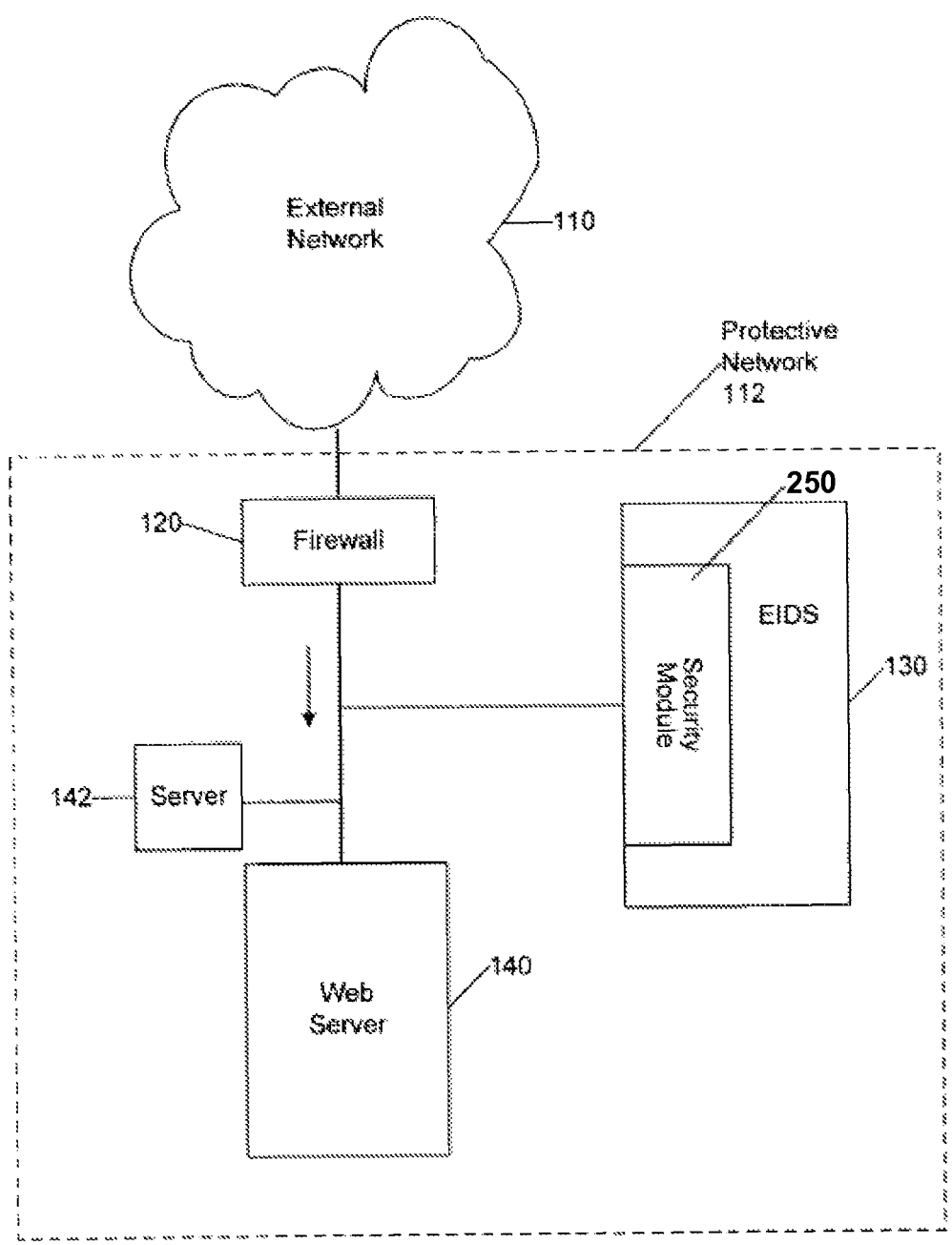
FIG. 1 is a network diagram illustrating an example network according to an embodiment of the invention.

FIG. 1 is a network diagram illustrating an example network An external network 110 communicates with a protected network 112. The external network 110 may be a local network, a wide area network, a private network, a public network, a wired network or wireless network, or any combination of the above, including the Internet. When communication traffic first enters the protected network from the external network 110, it passes through a firewall 120. A web server 140 is connected to the protected network 112 and communicates with the external network over the protected network and through the firewall. The protected network 112 can also include other devices or users such as a server 142. An EIDS 130 monitors traffic, typically in the form of Transmission Control Protocol/Internet Protocol (TCP/IP) packets, on the protected network 112 after it passes through the firewall 120. The EIDS can monitor and analyze all traffic on the protected network or it can monitor only selected traffic such as traffic going to the web server 140. The EIDS 130 analyzes both encrypted and non-encrypted packets.

Figure 2:
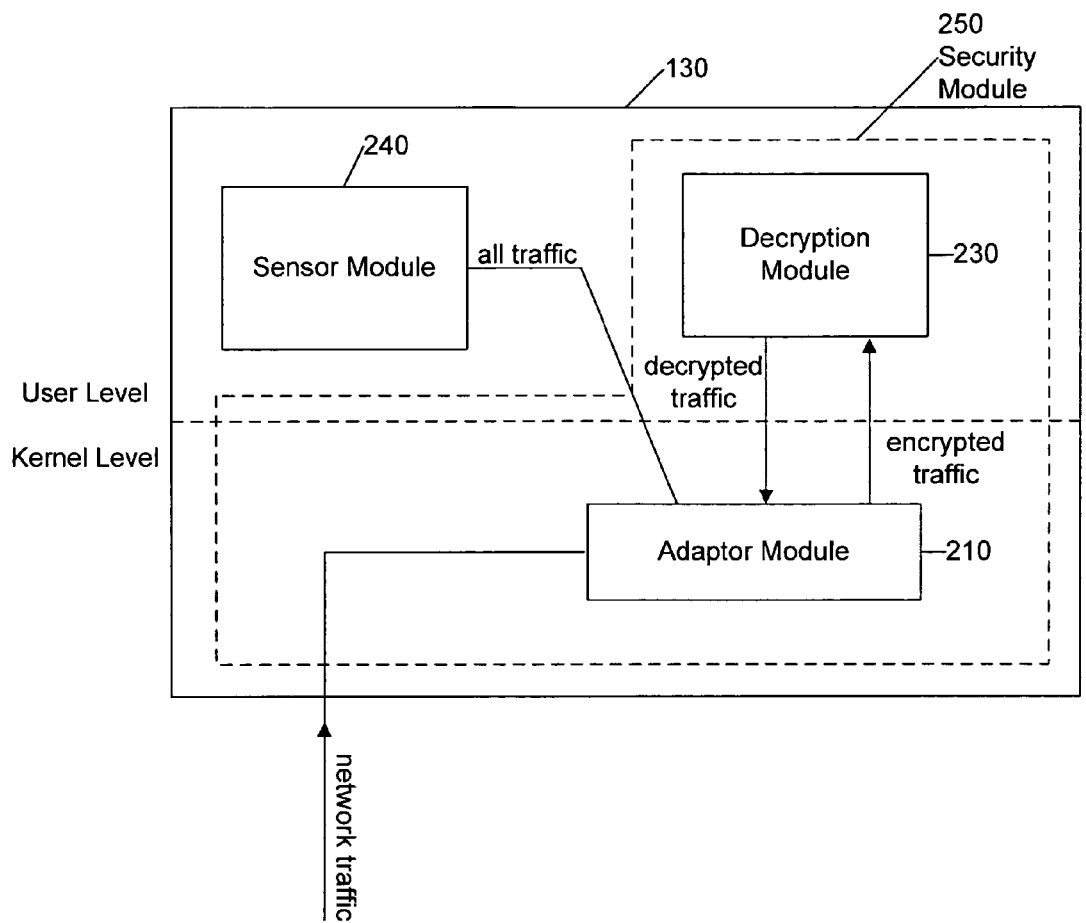
FIG. 2 is a block diagram illustrating an example enhanced intrusion detection system according to an embodiment of the invention.

FIG. 2 is a block diagram illustrating the example EIDS 130 of FIG. 1. The EIDS includes a security module 250 and a sensor module 240. The sensor module can include the capabilities typically found in Intrusion detection systems (IDS). In one embodiment, the sensor module is an IDS. The sensor module analyzes network traffic to detect network attacks, for example, Unicode hack, SQL Injection, and buffer overflow. The sensor module generates an alert when an attack is detected. To accomplish this, the sensor module can include both standard and customized attack signature detection engines. These engines are used to monitor and analyze network events for any signs of an attack or malicious activity. In one embodiment, the sensor module is further configured to block detected attacks.

The security module 250 provides an interface between the sensor module 240 and the protected network. The security module also decrypts encrypted packets and sends the decrypted packets to the sensor module.

The security module 250 includes an adaptor module 210 and a decryption module 230. The adaptor module 210 provides the interface to the sensor module and to the protected network. The adaptor module also routes received encrypted packets to the decryption module. In this embodiment the adaptor module functions at the kernel level which is the operating system level. Functioning at the kernel level is much more efficient as it requires less overhead and maintenance than the user-level processes.

The adaptor module 210 is typically configured to interface with a specific sensor module 240. In one embodiment the sensor module is a commercially available IDS and the adapter module is configured specifically to interface with that IDS. For example, the adapter module 210 can be configured to emulate the interface expected by the IDS, such as a network interface card (NIC). Additionally, the adaptor module can be configured to provide identification to the new traffic with the decrypted contents, by flagging it, so that it can be identified by the IDS.

As was noted above, one function of the adapter module is the routing of received packets. The adapter module sends all the SSL traffic to the decryption module 230. Additionally, in one embodiment the adapter module sends the SSL traffic to the sensor module unmodified, so that the sensor module can detect anomalies in the non-decrypted part of the SSL stream. The adapter module also inserts the decrypted SSL traffic, received from the decryption module, into the traffic sent to the sensor module.

The decryption module 230 decrypts SSL traffic received from the adapter module and transmit the decrypted traffic back to the adapter module. In one embodiment the decryption is performed using an SSL acceleration card (not shown). The decryption module can be configured to monitor SSL streams to specific web sites or addresses of the network system. When configuring the security module to protect such a site that uses HTTPS, a copy of the site's SSL certificate and SSL private key are provided to the decryption module so that it can decrypt the SSL traffic.

Either the decryption module or the adapter module can flag the decrypted SSL packets as preprocessed network traffic before such packets are sent to the sensor module 240. This flagging allows the sensor module to identify those preprocessed packets. In one embodiment flagging is accomplished by changing the destination IP address and port number of a packet to a predetermined IP address and port number that is recognized by the IDS as indicating a preprocessed packet.

Typically when the protected network 112 receives SSL or other encrypted traffic it must first receive and order the packets that make up the SSL frame before decrypting the entire frame to get to the payload. Clients and servers communicating via SSL are participating in a transaction that requires overhead for constructing and deconstructing frames. The decryption module 230 monitors SSL traffic and does not participate in the SSL transactions at all. In one embodiment the decryption module decrypts individual SSL packets as they are received without first reconstructing the entire SSL Frame.

An SSL session generally involves multiple connections to the network. An example of such a session is a request to a server for a secure web page that contains several icons. The SSL session would include connections for the HTML of the page and each icon displayed. The first connection request (called a handshake) in an SSL session involves authentication and is resource intensive. Subsequent handshakes involve a shared secret derived from the first handshake and are quick and inexpensive. Since the decryption module only monitors SSL traffic and is not involved in establishing connections, traffic will not necessarily arrive in order. Subsequently, it cannot be assumed that the initial handshake will be received before subsequent handshakes. Therefore, the decryption module can hold handshakes in a buffer until all necessary handshakes have been established/received.

The security module 250 operates in parallel with the sensor module. The security module 250 supplies both the original SSL traffic and the decrypted traffic to the sensor module. This allows the sensor module 240 to detect an attacker tampering with one of the data handshake messages sent by the client or by the server, a client sending distorted SSL protocol messages, a client sending tampered client certificates, a replaced or tampered server private key and attempts to force usage of weak encryption algorithms.

The sensor module 240 analyzes all of the traffic it receives from the adaptor module for attacks and vulnerabilities. In one embodiment, the sensor module includes the capability of blocking packets determined to be attacks. Attempts to block attacks detected in decrypted packets must be accounted for so the actual encrypted packet is blocked rather than merely blocking the decrypted packet sent by the adapter module. The adapter module includes the capability of detecting when the sensor module attempts to block a decrypted packet and then blocks the corresponding encrypted SSL traffic. In one embodiment this is accomplished by the adapter module monitoring outgoing resets (attempted blocks) from the sensor module and then sending a corresponding resets (blocks) for the SSL traffic. The adaptor module maintains a temporary mapping of SSL packets to the new packets with decrypted payloads. The adaptor monitors the traffic on the NIC or TCP resets sent by the sensor module 240. When a reset is detected the mapping is checked to determine if the reset corresponds to a decrypted packet and if so, sends a reset for the corresponding SSL encrypted packet. Alternatively, the traffic can be blocked. The sensor module 240 routes all unblocked traffic back out to the protected network.

Figure 3:
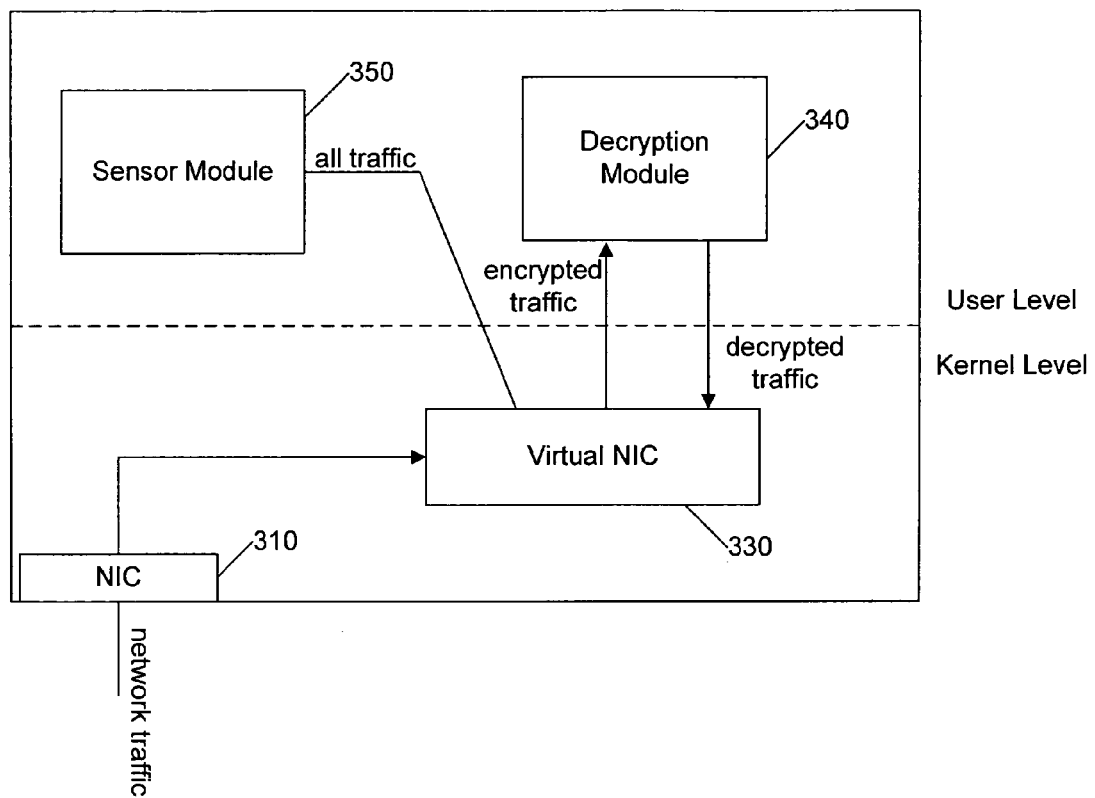
FIG. 3 is a block diagrams illustrating an example enhanced intrusion detection system in a Windows operating system according to an embodiment of the invention.

FIG. 3 is a block diagram illustrating an example EIDS of FIG. 1 in a WINDOWS® operating system. This EIDS includes a NIC 310, an adaptor module which functions in substantially the same manner as the adaptor module 210 in FIG. 2, comprised of a virtual NIC 330. This EIDS further includes a decryption module 340 and a sensor module 350 which function in substantially the same manner as the decryption module 230 and sensor module 240 of FIG. 2. The traffic travels toward the EIDS and first passes into the physical NIC 310. All network traffic travels from the NIC 310 to the virtual NIC 330. The virtual NIC emulates the physical NIC and acts as a conduit for traffic analysis as was described above in connection with the adaptor module 210. It functions as an adaptor by providing the interface between the sensor module 350 and the protected network.

The virtual NIC 330 provides hooks for inserting and extracting network traffic in a manner that is transparent to the sensor module 350. This provides a foundation for preprocessing traffic before it is sent to an application such as the sensor module 350. The virtual NIC 330 can redirect traffic from any source, most commonly a physical NIC 310. The traffic is then processed and then passed on to the application. An application that typically monitors network traffic through a NIC can monitor traffic through the virtual NIC as well. This allows additional modules to be added to the EIDS through a connection to the virtual NIC. For example, modules can be added to perform other types of analysis, such as unencoding, decrypting, filtering, etc.

The virtual NIC 330 extracts encrypted network traffic which it passes to the decryption module 340, which performs the same process as the decryption module 230 in FIG. 2, it passes the non-encrypted traffic directly to the sensor module 350, which performs the same process as the sensor module 240 in FIG. 2. In one embodiment at the decryption module 340 the decrypted payload is wrapped with a TCP envelope and then passed back to the virtual NIC 330. A TCP envelope is used so that the decrypted payload is provided to the IDS without changing the way the sensor functions. Alternatively, the sensor module 350 can be configured to receive and analyze the decrypted traffic without adding a TCP envelope. The virtual NIC 330 then passes the traffic from the decryption module 340 to the sensor module 250.

Figure 4:
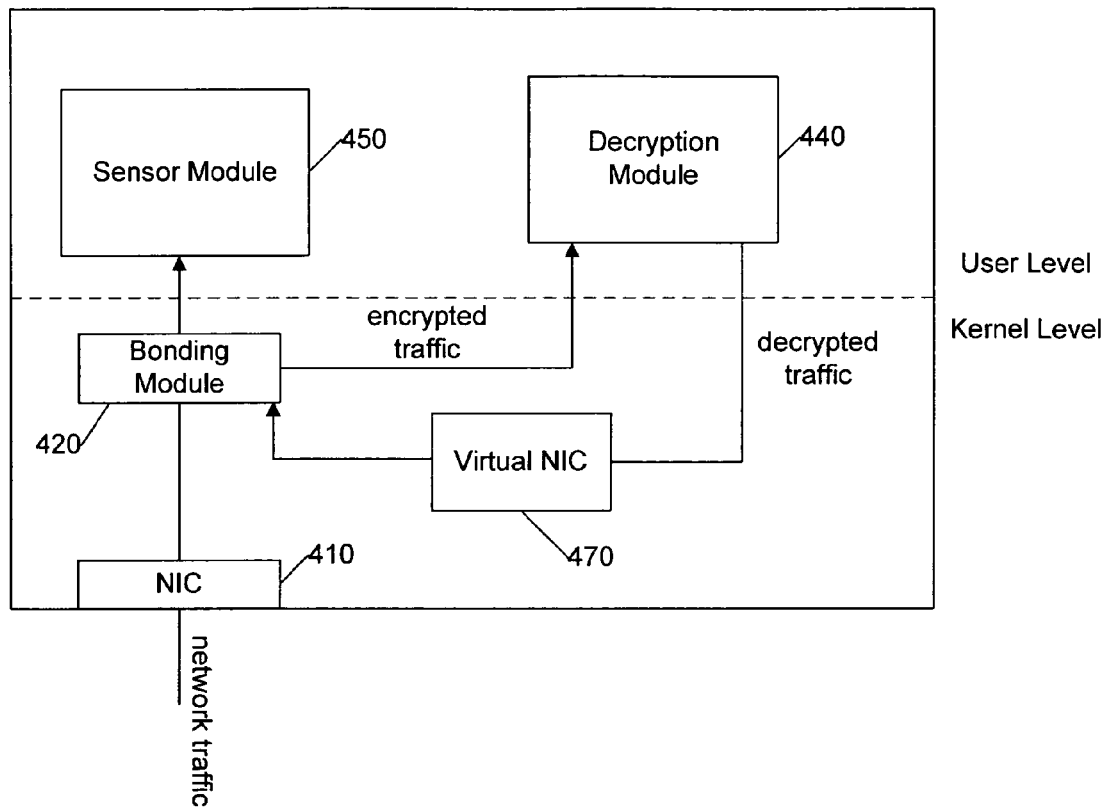
FIG. 4 is a block diagram illustrating an example enhanced intrusion detection system in a LINUX® operating system according to an embodiment of the invention.

FIG. 4 is a block diagram illustrating an EIDS of FIG. 1 in a LINUX® operating system. This EIDS includes a NIC 410, an adaptor module, which functions in substantially the same manner as the adaptor module 210 in FIG. 2, comprised of a bonding module 420 and a virtual NIC 470. This EIDS further includes a decryption module 440 and a sensor module 450, which function in substantially the same manner as the decryption module 230 and sensor module 240 of FIG. 2. The network traffic passes through the physical NIC 410 to the bonding module 420. Bonding is used to merge traffic from multiple physical network cards into a single stream of traffic to an application. The bonding module 420 passes the encrypted traffic to the decryption module 440 where it is decrypted. The decryption module sends the decrypted traffic to the virtual NIC 470. The decrypted traffic flows back to the bonding module where it is bonded with the non-encrypted traffic and is passed onto the sensor module 450 for analysis.

Alternative deployments or locations of the EIDS in a network are possible. In one embodiment the security module is placed in-line in the network where it decrypts packets for the sensor module as describe above and then re-encrypts the packet and inserts them back into the network traffic flow. This approach can introduce latency into the network and can create a new point of failure for the network. In addition, SSL may be used as part of the non-repudiation mechanism and therefore is required to prove the authenticity of a transaction. Breaking the SSL connection with an in-line decrypting device would invalidate any such non-repudiation mechanism. Alternatively, it is possible to use a host-based EIDS. A third choice is to connect the EIDS down-stream from the SSL terminator.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside, for example, in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

Those of skill will further appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention.

The invention claimed is:

1. A system to identify network attacks within packets received by a network, the system comprising:
an adaptor to route an encrypted packet to a decryption circuit, receive a decrypted packet corresponding to the encrypted packet from the decryption circuit, and transmit the decrypted packet and the encrypted packet to a sensor;
the decryption circuit to receive the encrypted packet, decrypt the encrypted packet to form the decrypted packet, and transmit the decrypted packet to the adaptor; and
the sensor to inspect the decrypted packet received from the adaptor to determine whether an attack is detected, to inspect the encrypted packet received from the adaptor to determine whether the attack is detected, and to block transmission of the encrypted packet to a destination identified in the encrypted packet when the attack is detected in at least one of the decrypted packet and the encrypted packet, wherein the adaptor is to detect an alert from the sensor, the alert indicating an attack detected within the decrypted packet, the adaptor to transmit a reset message to a sender of the encrypted packet when the attack is detected within the decrypted packet.

2. The system of claim 1, wherein the sensor is further to generate an alert when an attack is detected.

3. The system of claim 1, wherein the decryption circuit and the adaptor are in-line in the network.

4. The system of claim 3, wherein the decryption circuit is to encrypt the decrypted packet to form a second encrypted packet, and the adaptor is to insert the second encrypted packet into a network traffic flow.

5. An intrusion detection system for detecting network attacks within encrypted network traffic, the system comprising:
a physical network interface card (NIC) to receive network traffic;
a virtual NIC to receive network traffic from the physical NIC, route encrypted network traffic from the physical NIC to a decryption circuit, receive decrypted network traffic from the decryption circuit, route the decrypted network traffic and the encrypted network traffic to the sensor, transmit a reset message in response to the encrypted network traffic when a potential attack is identified in at least one of the encrypted network traffic and the decrypted network traffic, and block the encrypted network traffic when the potential attack is identified;
the decryption circuit to receive the encrypted network traffic from the virtual NIC, decrypt the encrypted network traffic to form the decrypted network traffic, and transmit the decrypted network traffic to the virtual NIC; and
the sensor to receive the decrypted network traffic and the encrypted network traffic from the virtual NIC, to analyze the decrypted network traffic and the encrypted network traffic to identify the potential attack.

6. The system of claim 5, wherein the decryption circuit is to wrap the decrypted network traffic with a Transmission Control Protocol/Internet Protocol (TCP/IP) envelope and route it to the virtual NIC.

7. The system of claim 5, wherein the adaptor is to label the decrypted network traffic as preprocessed network traffic before it is sent to the sensor.

8. The system of claim 5, wherein the physical NIC, the decryption circuit, and the virtual NIC are in-line in the network.

9. The system of claim 8, wherein the decryption circuit is to encrypt the decrypted packet to form a second encrypted packet and to insert the second encrypted packet into a network traffic flow.

10. A method for identifying network attacks, the method comprising:
routing an encrypted packet from a network to a security circuit,
decrypting the encrypted packet at the security circuit to form a decrypted packet,
receiving the decrypted packet from the security circuit;
maintaining a mapping of the encrypted packet and the decrypted packet;
routing the encrypted packet from the network to a sensor,
routing the decrypted packet received from the security circuit to the sensor;
monitoring the sensor to identify whether the sensor attempts to block at least one of the decrypted packet and the encrypted packet, the attempt to block the at least one of the decrypted packet and the encrypted packet indicating an attack; and
transmitting a reset message when the sensor attempts to block the at least one of the decrypted packet and the encrypted packet.

11. The method of claim 10, further comprising emulating a network interface card (NIC).

12. A tangible machine-readable storage disk or storage device comprising instructions which, when executed, cause a machine to at least:
decrypt an encrypted packet to form a decrypted packet;
record a mapping of the encrypted packet and the decrypted packet;
route the encrypted packet to a sensor;
route the decrypted packet to the sensor;
monitor the sensor to identify whether the sensor attempts to block at least one of the decrypted packet and the encrypted packet, the attempt to block the at least one of the decrypted packet and the encrypted packet indicating an attack; and
transmit a reset message if the sensor attempts to block the at least one of the decrypted packet or the encrypted packet.

13. The machine-readable storage disk or storage device of claim 12, further comprising instructions which cause the machine to emulate a network interface card (NIC).

14. The system of claim 1, wherein the adaptor is to transmit a reset message in response to the received encrypted packet when the attack is detected by the sensor.

15. The system of claim 2, wherein the alert is a reset message.

16. The system of claim 1, wherein the decryption circuit comprises a programmed processor.

* * * * *